United States Patent [19]
Zygutis et al.

[11] Patent Number: 5,441,304
[45] Date of Patent: Aug. 15, 1995

[54] SEAT BELT RETRACTOR ACTIVATION MECHANISM RESPONSIVE TO ANTI-LOCK BRAKING SYSTEMS

[75] Inventors: James L. Zygutis, Frankfort, Ill.; Gerald A. Doty, Crown Point, Ind.

[73] Assignee: Takata Inc., Auburn Hills, Mich.

[21] Appl. No.: 69,607

[22] Filed: Jun. 1, 1993

[51] Int. Cl.⁶ .............................................. B60R 22/48
[52] U.S. Cl. .................................. 280/806; 180/268; 180/282; 280/807
[58] Field of Search ................ 280/806, 807; 180/282, 180/268

[56] References Cited

U.S. PATENT DOCUMENTS

| | | | |
|---|---|---|---|
| 3,220,747 | 11/1965 | Marion | 280/150 |
| 3,363,712 | 1/1968 | Fontaine | 280/807 |
| 3,713,506 | 1/1973 | Lipschutz | 180/82 |
| 3,797,603 | 3/1974 | Loomba | 180/82 |
| 4,655,312 | 4/1987 | Frantom et al. | 180/268 |
| 4,703,950 | 11/1987 | Pickett | 280/806 |
| 4,771,854 | 9/1988 | Syrowik | 280/807 |
| 5,201,385 | 4/1993 | Browne et al. | 280/807 |

*Primary Examiner*—Eric D. Culbreth
*Attorney, Agent, or Firm*—Fitch, Even, Tabin & Flannery

[57] ABSTRACT

In accordance with the present invention, there is provided a vehicle seat belt retractor having an activation system that responds to an anti-locking braking system and that actuates the retractor to prevent protraction of the seat belt. The preferred activation system includes a control circuit that energizes an activation mechanism when the anti-locking braking system is activated and prohibits energization of the activation mechanism when the braking system is deactivated. The preferred activation mechanism is a small modular unit which is externally mounted to a seat belt retractor and which generally includes a base, an activation lever and a solenoid. The base is mounted to the side of the retractor, and the solenoid and the activation lever are mounted on the base. More particularly, the activation lever is pivotally mounted on the base and extends into the retractor to a position underneath the pawl of the retractor. The activation lever rotates between a neutral position in which it is spaced from the pawl of the retractor and an actuated position in which it engages and urges the pawl into engagement with the ratchet wheels to prevent protraction of the seat belt. The activation lever also attaches to the solenoid, and the solenoid rotates the activation lever to its actuated position in response to an anti-lock braking system used in the vehicle.

16 Claims, 2 Drawing Sheets

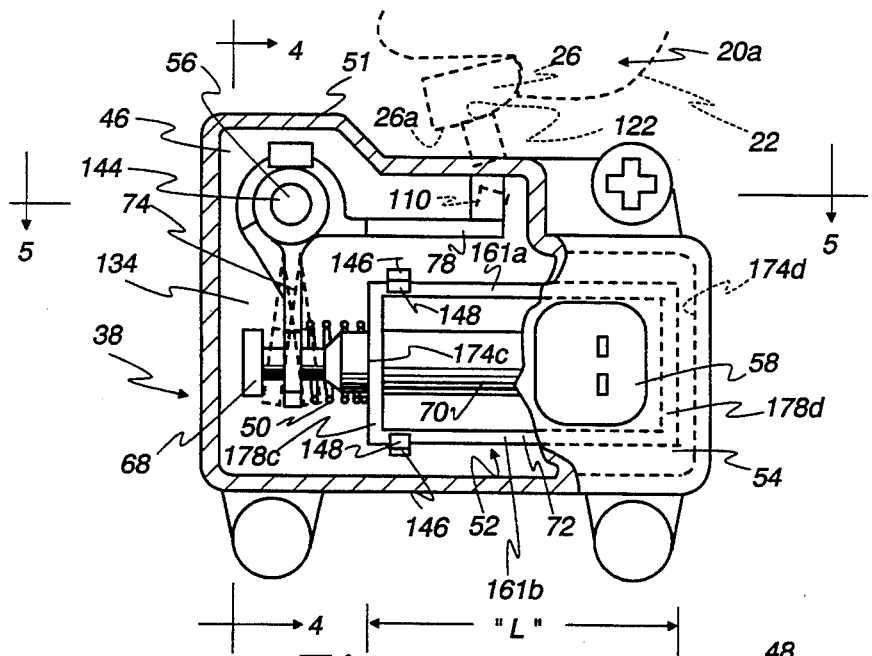
Fig. 3
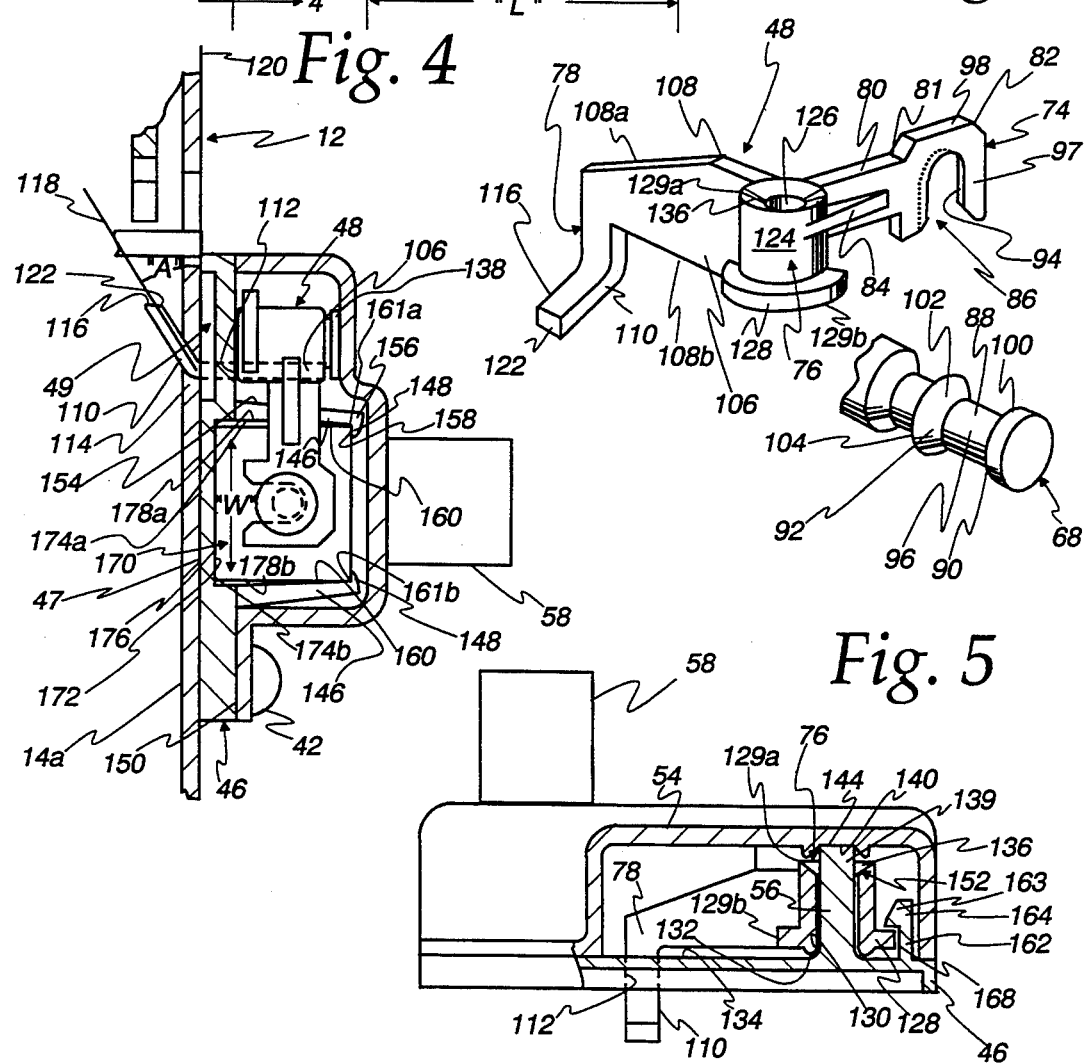
Fig. 4
Fig. 6
Fig. 5

SEAT BELT RETRACTOR ACTIVATION MECHANISM RESPONSIVE TO ANTI-LOCK BRAKING SYSTEMS

FIELD OF THE INVENTION

This invention relates to seat belt retractors for vehicles, and more particularly to an activation mechanism for activating a ratchet mechanism which is common to many such retractors to prevent seat belt protraction.

BACKGROUND OF THE INVENTION

A wide variety of seat belt retractors for vehicles have been developed to prevent protraction of the seat belt. Many such retractors respond to prevent seat belt protraction during periods evidencing emergency conditions. These seat belt retractors commonly comprise a reel, upon which a seat belt is wound, having a ratchet wheel with teeth to be engaged by a pivotally frame-mounted pawl. The pawl is normally biased in a non-engaging position in which the pawl is spaced from the ratchet wheel, and to prevent belt protraction, an emergency activation device actuates the pawl into engagement with the ratchet wheel. This is to prevent protraction of the seat belt during instances evidencing emergency conditions. A common emergency activation device is an inertial mechanism which operates in response to vehicle accelerations or decelerations greater than a predetermined value.

More particularly, during vehicle operation periods of constant speed or modest acceleration or deceleration, the pawl is typically biased, such as by gravity, to its non-engaging position with respect to the ratchet wheel. The inertial mechanism responds to changes in acceleration or deceleration greater than a predetermined value to urge the pawl into engagement with the ratchet teeth. That is, in an emergency locking retractor employing an inertial device, the seat belt is unrestrained against protraction under normal vehicle operation, and when the inertial device responds to vehicle acceleration or deceleration greater than a predetermined value, the inertial mechanism forces the pawl to pivot into engagement with the teeth of the ratchet wheel to prevent belt protraction.

To exceed the predetermined value in some inertial mechanisms, some minimum change in acceleration or deceleration, even though slight in some instances, is required in order for the inertial mechanism to actuate the pawl into engagement with the ratchet wheel. However, there may be times when an emergency condition exists and goes unnoticed by the inertial mechanism because the change in acceleration or deceleration is not greater than the predetermined value. For example, when a vehicle slides across a surface having a low coefficient of friction, such as a surface covered with ice, standing water or gravel, the vehicle may not accelerate or decelerate by a value greater than the predetermined value necessary to be noticed by the inertial mechanism. As a result, the inertial mechanism may not actuate the pawl into engagement with ratchet wheel to prevent protraction of the seat belt.

In this connection, effort has been directed to activation mechanisms which respond to other features of a vehicle, such as braking systems used in vehicles. With activation mechanisms that respond to braking systems, advantages include having a retractor which is not entirely dependant upon an inertial mechanism and which, in some instances, would lock up earlier because the braking systems would be activated before the inertial mechanism could experience the required change in acceleration or deceleration. Furthermore, vehicle operators, in many instances, tend to apply the vehicle's brakes upon surfaces which have a low coefficient of friction.

An example of a brake activated safety device is disclosed in U.S. Pat. No. 3,220,747. In this example, a seat belt retractor is automatically operable in response to excessive emergency application of the vehicle's brake system. A disadvantage with this type of activation includes the inability to be adapted to today's common retractors which use ratchet mechanisms having a pawl to lock the retractor against belt protraction. Another disadvantage tends to be that some vehicle operators may not be able to apply sufficient force to the brake pedal or that some vehicle operators may lightly pump the brake pedal to prevent the tires from locking up, such as on surfaces having a low coefficients of friction. As a result, the activation mechanism may not effectively actuate to lock the retractor against belt protraction due to a lack of excessive braking force to the foot pedal.

Another example of a brake activated seat belt retractor is disclosed in U.S. Pat. No. 3,797,603. In this example, a seat belt retractor is actuated upon application of a brake system and/or an inertial system. More particularly, a magnet supplied with current maintains the retractor so the belt is free to be protracted, and upon interruption of the current, the retractor locks up to prevent protraction of the belt. Such current interruption is upon opening of a pressure switch responsive to the hydraulic pressure in a vehicle's brake system and/or the opening of an inertial switch responsive to a change in acceleration of the vehicle.

However, a disadvantage with this type of brake pedal activation mechanism is that it may tend to cause the seat belt retractor to unnecessarily lock up to prevent belt protraction upon every application of the brake pedal. This may place unnecessary wear and tear on the retractor's components. Furthermore, during normal vehicle operation, it is desirable to move the upper torso for looking out the rear and rear quarter sides of the vehicle and for convenience, such as to reach about the vehicle.

It is also known that some activation mechanisms are activated by a variety of electric signals. An example of an electrical activated seat belt retractor is disclosed in U.S. Pat. No. 4,655,312. In this example, a seat belt retractor is actuated by an electric motor in response to a crash sensor. The disclosed crash sensor is an inertia activated switch or a simple radar system and causes the electric motor to be energized to remove most of the belt slack prior to a crash. A disadvantage is that this particular retractor relies entirely on an inertial mechanism to actually lock up the retractor against protraction of the seat belt during the crash. The electric motor only removes the belt slack prior to the inertial mechanism being activated by certain inertial forces to lock up the retractor against protraction of the belt.

It is apparent from the foregoing that there is a need for a seat belt retractor having an activation mechanism which may actuate the seat belt retractor either independently or in addition to the inertial mechanism to prevent seat belt protraction. It is also desired that the activation mechanism reduce unnecessary wear and tear on itself and the retractor.

An overall object is to provide an activation mechanism which is effective, efficient, durable and cost effective to manufacture, install and operate.

The present invention offers a solution to the aforedescribed problems by providing an activation mechanism which is readily applied to a retractor to actuate the retractor to prevent belt protraction in situations in which other activation mechanisms may not respond.

SUMMARY OF THE INVENTION

In accordance with the present invention, there is provided a seat belt retractor having an activation mechanism that responds to an anti-lock braking system to actuate the seat belt retractor to prevent protraction of the seat belt. The preferred seat belt retractor comprises in general a retractor frame in which a reel, upon which a seat belt is wound, is journaled for rotation on a reel shaft. A retractor spring supported from the retractor frame is connected to the reel shaft in a manner which biases the reel in a belt retraction direction and which permits the belt to rotate the reel in a belt protraction direction as it is unwound from the reel.

A ratchet wheel coupled to the reel has ratchet teeth which may be engaged by a pivotally frame-mounted locking pawl. The pawl may pivot between an inoperative position in which the pawl is spaced from the ratchet teeth and an operative position in which the pawl is engaged with the ratchet teeth to lock the reel against rotation in the belt protraction direction.

An inertial device may be provided for actuating the locking pawl in response to a predetermined change in acceleration or deceleration of the vehicle to pivot the locking pawl to its operative position.

The activation mechanism of the present is a modular unit which is externally mounted on the seat belt retractor and comprises in general a base, an activation lever, a solenoid, an activation circuit and a cover. The preferred actuation unit is a compact and small modular package that can be attached to an existing retractor to convert it from the usual inertially-operated retractor to one which additionally is operated with operation of the anti-locking braking system. Preferably, the unit has an electrical connector wired to the solenoid and having electrical contacts therein. When installing the retractor into a vehicle, a mating connector on an electrical cable connected to the ABS system may be attached to have its electrical contacts engaged with the contacts in activation unit's connector. The base may be mounted to the seat belt retractor by a plurality of screws. The base comprises a post on which the activation lever is pivotally mounted and about which the activation lever rotates. The activation lever comprises a plunger portion which attaches to the solenoid and a pawl portion which extends into the retractor to a position underneath the pawl of the retractor. The cover seals and protects the activation mechanism.

The solenoid comprises a spring and a plunger. The solenoid and the spring rotate the activation lever between a neutral position in which it is spaced from the pawl and an actuated position in which it engages the pawl to urge it into engagement with the ratchet wheels of the retractor to prevent protraction of the seat belt. More specifically, the spring biases the activation lever to its neutral position, and upon activation, the solenoid attracts the plunger to rotate the activation lever to its actuated position.

The solenoid is preferably activated in response to the anti-lock braking system used in the vehicle. More particularly, when the anti-lock braking system is activated, the activation circuit closes and causes the solenoid to be energized by a power source to rotate the activation lever.

DETAILED DESCRIPTION OF THE INVENTION

The present invention will be described in connection with the accompanying drawings, which illustrate the preferred embodiments and details of the invention, and in which:

FIG. 3 is a front elevational view of the activation mechanism of the present invention depicting various components;

FIG. 4 is a cross-sectional view of the activation mechanism taken along line 4—4 of FIG. 3;

FIG. 5 is a cross—sectional view of the activation mechanism taken along line 5—5 of FIG. 3; and FIG. 6 is perspective view of an activation lever employed in the activation mechanism of the present invention.

DETAILED DESCRIPTION OF THE PREFERRED EMBODIMENT

Figure 2:
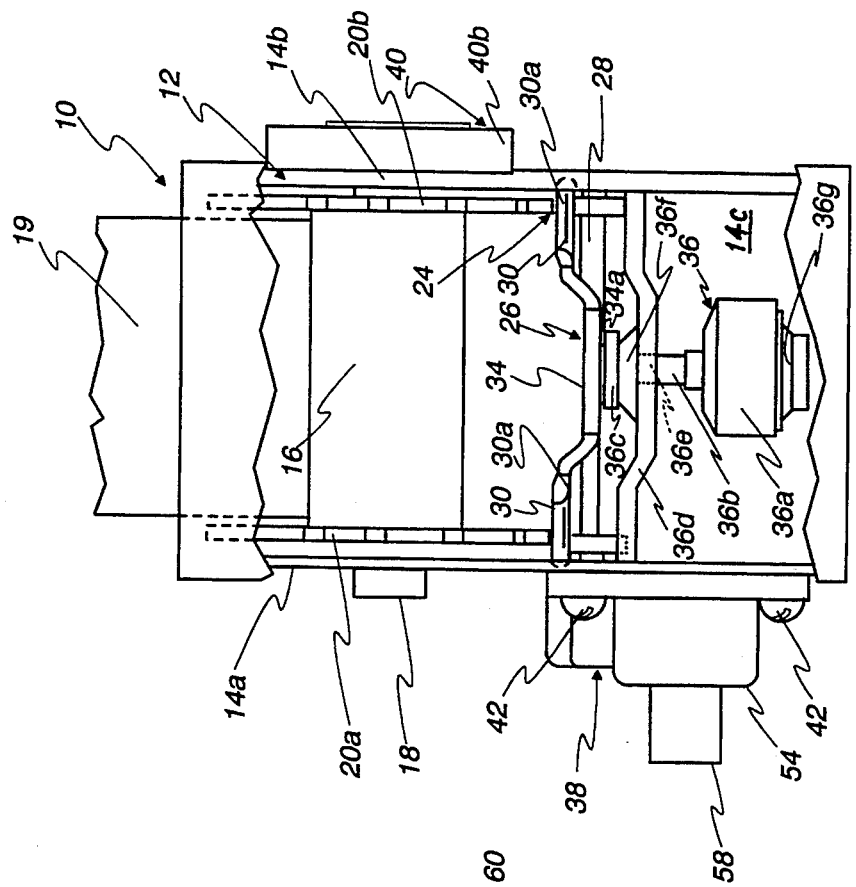
FIG. 2 is a front elevational view of the seat belt retractor of FIG. 1 depicting various components and embodying the activation mechanism of the present invention.
Figure 1:
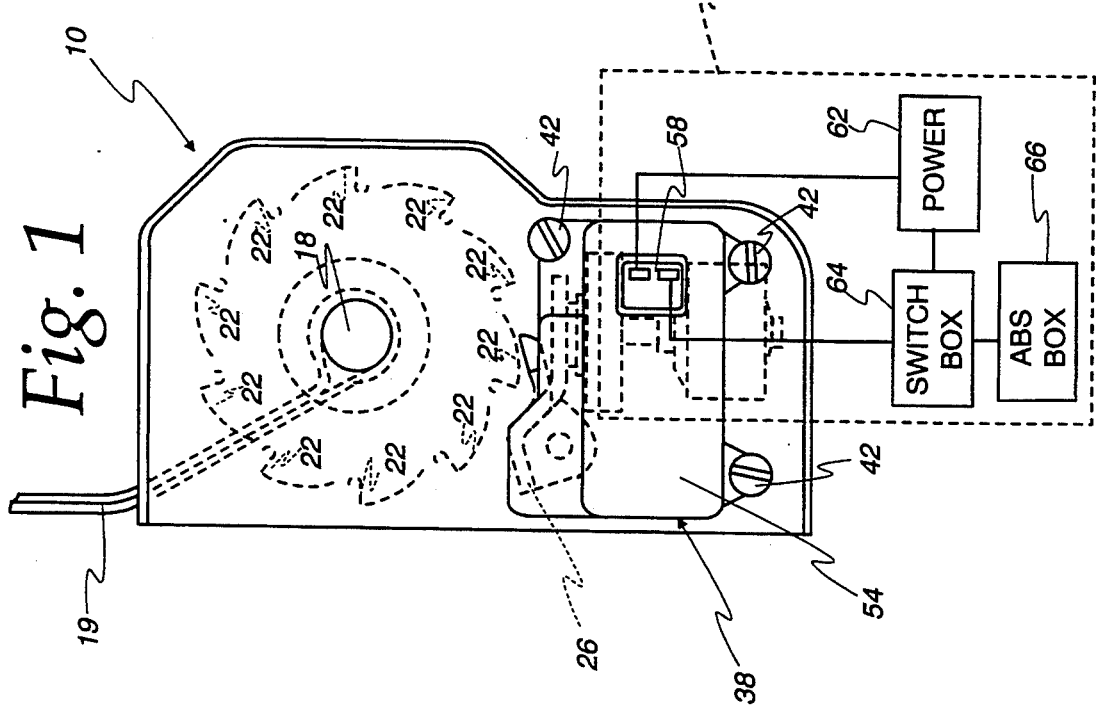
FIG. 1 is a left side elevational view of a seat belt retractor embodying an activation mechanism of the present invention.

With initial reference to FIG. 2 for a general description, the invention will be described in connection with a seat belt retractor 10 which includes a U-shaped frame 12 having parallel spaced sidewalls or side plates 14a and 14b which are connected by a base portion 14c. Mounted for rotation between the side plates 14a and 14b of the frame 12 is a spool or reel 16 upon which a seat belt 19 is wound. The reel 16 has a reel shaft 18 journaled for rotation about its axis in the side plates 14a and 14b. The reel 16 is also provided with a pair of ratchet wheels 20a and 20b, which are conventional in structure and form, and include a plurality of ratchet teeth 22 (FIG. 1).

The ratchet wheels 20a and 20b are a part of a ratchet mechanism 24 to prevent protraction of the seat belt 19. The ratchet mechanism 24 further comprises a lock bar or locking pawl 26 which is pivotally mounted, such as on a shaft 28 or the like, to the side plates 14a and 14b for limited pivotal movement. The pawl 26 extends between the side plates 14a and 14b and comprises a pair of teeth 30. Each of the teeth 30 is configured with an inclining surface 30a which adapts the teeth 30 to interspersedly engage two adjacent ratchet teeth 22 of the ratchet wheels 20a and 20b. This prevents the reel 16 from rotating clockwise, as viewed in FIG. 1, to prevent protraction of the belt 19.

To bias the locking pawl 26 to its disengaged position in which the pawl 26 is spaced from the ratchet wheels 20a and 20b and also for operating and actuating the ratchet mechanism 24, the locking pawl 26 comprises a central plate portion 34 which is engaged at its midpoint by a vehicle sensitive, inertial mechanism 36. The structure and function of the inertial mechanism 36 is entirely conventional and is intended to actuate the ratchet mechanism 24 in response to accelerations or decelerations greater than a predetermined value. That is, upon a predetermined change in acceleration or deceleration of the vehicle, the inertial mechanism 36 activates to pivot the locking pawl 26 counter-clockwise, with respect to FIG. 1, into engagement with the ratchet wheels 20a and 20b to prevent protraction of the seat belt 19.

More particularly, the preferred inertial mechanism 36 is commonly a pendulum type mechanism comprising primarily of two elements, a weight 36a and a shaft 36b. The weight 36a is attached at a lower end of the shaft 36b with a press ring 36g. At the opposite end, the shaft 36b includes a disc 36c integrally formed therefrom. The shaft 36b extends through an annular opening 36e centrally located about a support 36d, and the disc 36c rests on a tapered annular ring 36f surrounding the annular opening 36e.

With its ends, the support 36d attaches to the side plates 14a and 14b, and the tapering annular ring 36f projects from and above the support 36d to enable the weight 36a to swing. For example, the weight 36a oscillates in response to accelerations and decelerations greater than a predetermined value. As a consequence, the shaft 36b becomes displaced from the vertical, and as a result, the disc 36c inclines from the horizontal and forces the locking pawl 26 to pivot counter-clockwise, with respect to FIG. 1, into engagement with the ratchet wheels 20a and 20b. The structure and function of the inertial mechanism 36 are entirely conventional, and the shape and position of the inertial mechanism may be varied from that illustrated herein and also fall within the purview of this invention.

To retract the seat belt 19, a belt retraction mechanism 40 is exteriorly mounted on the right-hand side of the retractor 10 to side plate 14b of the frame 12. The belt retraction mechanism 40 comprises a housing 40b and a spring (not shown) mounted within the housing 40b. The spring is typically a helical spring which is attached to the reel shaft 18 to bias the reel 16 to retract the belt 19, and the spring biases the reel 16 in a counter-clockwise, with respect to FIG. 1. Generally, the structure and function of this type of belt retraction mechanism is entirely conventional and may be mounted to either side of the retractor.

On the other side of the retractor 10, an activation mechanism 38 of the present invention is exteriorly mounted to side plate 14a of the frame 12. A cover 54 covers and protects internal components of the activation mechanism 38. A fastening means secures the cover 54 to the activation mechanism 38. The fastening means may take various forms such as snap feet and/or threaded fasteners. Herein, a plurality of screws 42, preferably at least three screws (FIG. 1), secure the cover 54 to the activation mechanism 38 while additionally securing the activation mechanism 38 to the side plate 14a.

The present invention is concerned with activating the ratchet mechanism 24 and, in particular, to activate the ratchet mechanism 24 in certain instances when the inertial mechanism 36 does not activate the ratchet mechanism 24. The preferred activation mechanism 38 activates the ratchet mechanism 24 in response to an anti-lock braking system.

It is preferred to combine the activation mechanism 38 of the present invention with an emergency locking mechanism such as the above described inertial mechanism 36. Thus, the preferred activation mechanism 38 is designed to work with other activation mechanisms, such as the inertial mechanism and the like, without interfering with the functions of any such other activation mechanisms. Also, it is probably that in some instances both the inertial mechanism and the activation mechanism will simultaneously activate the ratchet mechanism to prevent protraction of the belt. This is also permissible because the present invention is designed to work effectively with other types of activation mechanisms.

Turning to FIG. 3, the preferred activation mechanism 38 is a small modular unit comprising a base 46, an activation lever 48, a spring 50, a solenoid 52 and the cover 54. The configuration of the base 46 and the cover 54 and the arrangement about the base 46 of the solenoid 52 and the activation lever 48 with respect to the retractor 10 will be better understood from the following description.

The preferred activation unit is a very compact and small package that can be readily added to a conventional retractor because it is self-contained within its cover 54 and base 46. Preferably, the activation unit includes an outer electrical connector 58, which is wired to the solenoid and has electrical contacts therein for engaging electrical contacts in a mating connector on the end of an electrical cable. The electrical connector 58 thus may be connected to a controlling circuit in the vehicle in a quick and easy manner. In another embodiment of the invention, not illustrated herein, the connector has been rotated down 90° from the horizontal position shown in FIG. 4.

The base 46 comprises a post 56 which projects therefrom, and the activation lever 48 is pivotally mounted on the post 56 to rotate between an activated position in which it activates the ratchet mechanism 24 by forcing the pawl 26 into engagement with the ratchet wheels 20 and 20b and a neutral position in which the activation lever 48 is spaced from the pawl 26. When the activation lever 48 is in its neutral position, the pawl 26 is free to respond to gravity and to the inertial mechanism 36, as best shown in FIG. 2.

To activate the ratchet mechanism 24, the activation lever 48 attaches to the solenoid 52 and reaches into the retractor 10 to engage underneath the pawl 26. The spring 50 biases the activation lever 48 to its neutral position. The solenoid 52 comprises a solenoid housing 72 and a plunger 68. The plunger 68 moves linearly within the solenoid 52 to compress the spring 50 and to rotate the activation lever 48 to its activated position. That is, the solenoid 52 rotates the activation lever 48 counter-clockwise, as illustrated in FIG. 3, in which the activation lever 48 then urges the pawl 26 into engagement with the ratchet teeth 22 of the ratchet wheels 20a and 20b. The solenoid 52 is electrically connected to the connector which is connected by a cable to an activation circuit 60 (FIG. 1). The activation circuit 60 closes upon a signal from the anti-lock braking system 66 (FIG. 1) or its cooperating sensor. Such connection may be done by a wire, cable, wireless transmission or any other method for transmitting a signal.

Turning to FIG. 1, the preferred signal is generated in cooperation with the anti-lock braking system 66 and is then transmitted to a switch box 64. The switch box 64 closes the activation circuit 60 to energized the solenoid 52 with the power source 62. As illustrated, the anti-lock braking system 66 may include a means for sensing (not shown) relevant conditions, such as a relationship between a driving surface upon which the vehicle travels and its wheels and/or tires of the vehicle upon such surface. The sensing means sends a signal to activate the anti-lock braking system 66. With respect to the present invention, this signal, in addition to activating the anti-lock braking system 66, also, activates the activation circuit 60 to energize the solenoid 52 of the activation mechanism 38. The solenoid 52 rotates the activation lever 48 into engagement with the pawl 26 to activate the ratchet mechanism 24 to prevent the belt 19 from being protracted.

As illustrated, the activation circuit 60 comprises the connector 58 being attached to the solenoid housing 72 and connected to the solenoid 52, a power source 62, a switch box 64, and the anti-lock braking system 66. Traversing the illustrated circuit clockwise, the connector 58 connects to the power source 62; the power source 62 connects to the switch box 64; and the switch box 64 connects to the connector 58. The switch box 64 also connects to the anti-lock braking system 66, which transmits a signal to the switch box 64. Upon receiving the activation signal from the anti-lock braking system 66, the switch box 64 closes the circuit 60 to energize the solenoid 52.

Returning to FIG. 3, the preferred solenoid 52 comprises a plunger 68, a coil housing 70, the solenoid housing 72 and the connector 58. The plunger 68 extends into the coil housing 70 to be surrounded by a coil (not shown) of insulated wire located within the coil housing 70. When the coil is energized, a magnetic field is produced to attract the plunger 68 to a position within the coil. This attraction moves the plunger 68 linearly to the right, with respect to FIG. 3, and, in doing so, compresses the spring 50 and rotates the activation lever 48 to engage the pawl 26 to activate the ratchet mechanism 24. With respect to the present invention, it is important that the preferred solenoid 52 is small in size for adapting the activation mechanism 24 to be readily mounted to a vast range of retractors, but, in all other aspects, the structure and function of the solenoid 52 is entirely conventional.

Turning now to FIG. 6, the preferred activation lever 48 has in general a right angle configuration comprising a plunger portion 74 for attaching to the plunger 68 and a pawl portion 78 for actuating the pawl 26. Both the plunger portion 74 and the pawl portion 78 extend at a right angle with respect to one another from a center portion 76. The center portion 76 pivotally mounts the activation lever 48 on the post 56 of the base 46.

More particularly, the plunger portion 74 extends integrally from the center portion 76 and comprises an arm portion 80 and a slot portion 82. The arm portion 80 is generally rectangular and extends outwardly lengthwise from the center portion 76. A web 84 extends perpendicular to, and between, both the center portion 76 and the arm portion 80. The web 84 integrally extends from the center portion 76 at an intermediate vertical position with an approximate arc length of 80 degrees to 100 degrees and extends lengthwise along or near a center line of the arm portion 80. The web 84 assists in bracing the arm portion 80 while the arm portion 80 is being acted upon by the plunger 68. In another embodiment of the invention, the web has been removed and the lever is stiffened by making it with an increased cross-sectional thickness adjacent the center portion 76.

The arm portion 80 comprises an outer end 81, and the slot portion 82, which is generally rectangular, integrally extends from the outer end 81 in the same plane as the arm portion 80 with a perpendicularly lengthwise orientation to the arm portion 80. The slot portion 82 comprises a slot 86 to attach to the plunger 68. The slot 86 opens toward the base 46, as best illustrated in FIG. 4, and comprises particular dimensions, such as length and width, to receive a particular plunger, such as plunger 68. In another embodiment of the invention, the direction of the slot portion 82 has been rotated 90° to have the opening at the distal end opening outwardly away from the center portion 76. The slot 86 is configured to have a loose fit on the solenoid plunger 68 so that the linear travel of the plunger 68 does not bind on the rotating activation lever 48.

The plunger 68 integrally comprises a shaft 88, an end stop 90, which is located at or near the end of the shaft 88, and an intermediate stop 92, which is located inward from the end stop 90. The end stop 90 and the intermediate stop 92 are particularly spaced from one another along the shaft 88. The plunger portion 74 comprises a particular constant thickness, and as a result, the particular spacing is larger than such thickness to assist in receiving the slot portion 82 in a manner which enables the slot 86 to pivot with respect to the shaft 88 when the activation lever 48 rotates between its activated position and its neutral position.

The slot 86 comprises an inner slot surface 94, and the shaft 88 comprises an outer shaft surface 96, and when the slot portion 82 and the plunger 68 are coupled, the inner slot surface 94 engages the outer shaft surface 96. The slot portion 82 comprises a front surface 97 and a back surface 98, the end stop 90 comprises an inner surface 100 and the intermediate stop 92 comprises an outer surface 102. The outer surface 102 engages the back surface 98 when rotating the activation lever 48 to its neutral position, and the front surface 97 engages the inner surface 100 when rotating the activation lever 48 to its actuated position.

Further, when the solenoid 52 is activated and the activation lever 48 is in its actuated position, the plunger portion 74 of the activation lever 48 is perpendicular to the shaft 88. However, when the solenoid 52 is deactivated and the spring 50 rotates the activation lever 48 to its neutral position, the plunger portion 74 is at an angle other than 90 degrees with respect to the shaft 88, and as a result, the end stop 90 and intermediate stop 92 must be sufficiently spaced from each other to enable the inner slot surface 96 to pivot on the outer shaft surface 96 as the activation lever 48 is being rotated between its actuated position and its neutral position.

Turning now to FIGS. 3 and 6, the spring 50 is typically a helical spring through which the shaft 88 may extend. In this instance, the spring 50 is located between the intermediate stop 92 and the solenoid housing 72 with the shaft 88 extending through the spring 50. The intermediate stop 92 includes an inner stop surface 104 for engaging the spring 50, and the solenoid housing 72 comprises an outer end surface 178c also for engaging the spring 50. The spring 50 forces the plunger 68 outward when the solenoid 52 is not energized to thereby pivot the activation lever 48 to its neutral position.

Turning to FIG. 6, the pawl portion 78 for actuating the pawl 26 extends integrally from the center portion 76. It extends from the center portion 76 at a right angle with respect to the plunger portion 74. The pawl portion 78 comprises an arm 106 and a finger or an engaging portion 110. More particularly, the arm 106 extends from the center portion 76 to position the engaging portion 110 inside the retractor 10 for actuating the ratchet mechanism 24. The arm 106 is generally rectangular with the exception of a portion 108a of a side 108. The portion 108a converges inward while proceeding outward on the arm 106 from a position intermediate a free end 111 of the arm 106 and the center portion 126.

Turning now to FIGS. 4 and 6, the base 46 comprises a back side 47 which includes a recess 49. The base 46 further comprises an aperture 112 which extends through the base 46 and the recess 49, and the side plate 14a of the frame 12 comprises an aperture 114. When the activation mechanism 38 is properly mounted on the retractor 10, both apertures 112 and 114 are substantially aligned. The engaging portion 110 extends integrally from the arm 106 to extend first through the aperture 112 in the base 46 and secondly through the aperture 114 in the side plate 14a of the retractor frame 12. In this instance, both apertures 112 and 114 are positioned adjacent from a top edge 51 (FIG. 3) of the activation mechanism 38. This placement enables the apertures 112 and 114 to cooperate with the placement of the activation lever 38 and solenoid 52 about the base 46 and the activation mechanism 38 with respect to the side plate 14a of the retractor 10 to allow the engaging portion 110 to extend inside the retractor 10 to a position underneath the pawl 26 for being able to properly engage and pivot the pawl 26. Manifestly, the placement of the apertures must cooperate with the placement of the activation lever and the solenoid about the base and the activation mechanism with respect to the retractor to allow the engaging portion to extend inside the retractor to a position to effectively activate the ratchet mechanism to prevent protraction of the belt.

Additionally, both apertures 112 and 114 are sized sufficiently to allow the engaging portion 110 to pivot through an arcuate path as the activation lever 48 rotates between it activated position and its neutral position, as best illustrated in FIG. 3.

More particularly, the arm 106 comprises a side 108b which is opposite its side 108, and the engaging portion 110 extends from this opposite side 108b. The engaging portion 110 comprises a free end 116 and extends from the side 108b first in a plane containing the arm 106 and then at an angle "A" to a plane perpendicular to the plane containing the arm 106 to place the free end 116 inside the retractor 10. More particularly, the angle "A" is between reference lines 118 and 120, as illustrated in FIG. 4, and wherein the reference line 120 is in the plane perpendicular to the plane containing the arm 106. The free end 116 comprises a surface 122 which is generally planar for engaging the pawl 26 at its underside 26a (FIG. 3) inside the retractor 10.

Returning to FIG. 6, the center portion 76, which interconnects the plunger portion 74 and the pawl portion 78, enables the activation lever 48 to be rotated between its activated position and its neutral position. The center portion 76 is generally cylindrical with an upper end 129a and a lower end 129b and comprises an outer surface 124, a centrally located aperture 126 and an collar 128. The plunger portion 74 and the pawl portion 78 extend continuously from the outer surface 124, and the collar 128 extends continuously from the outer surface 124 at the lower end 129b of the center portion 76. In another embodiment of the invention, the collar 128 has been deleted.

The centrally located aperture 126 extends axially through the center portion 76 and has a diameter slightly larger than the diameter for the post 56 to allow the activation lever to rotate effectively about the post 56. Any clearance between the post 56 and the center portion 76 is preferably minimal to eliminate any play, or wobble, between the two as the activation lever 48 rotates about the post 56. In this instance, the annular ring 128 extends around approximately 260 degrees to 280 degrees of the lower end 129b to interconnect the plunger portion 74 and the pawl portion 78.

Turning to FIG. 5, the base 46 comprises a short tab 162 which integrally extends from the base 46 to a free end 163. In another embodiment of the invention, the tab 162 has been removed. The tab 162 comprises a hook 164 which is integrally formed at the free end 163 to engage the annular ring 128 to retain the activation lever 48. More particularly, the collar 128 comprises an upper surface 166, and the hook 164 comprises an underneath surface 168, and these surfaces 166 and 168 may engage to retain the activation lever 48 against longitudinal movement with respect to the post 56, but leaving the upper surface 166 of the collar 128 able to move with respect to the underneath surface 168 of the hook 164 to enable the activation lever 48 to effectively rotate.

The center portion 76 comprises an annular ring 130 which projects in the axial direction, with respect to the aperture 126, from the lower end 129b of the center portion 76. The annular ring 130 has an arcuate cross-section. The base 46 comprises a front surface 134, and the annular ring 130 comprises an arcuate surface 132 for engaging the front surface 134 of the base 46. During rotation of the activation lever 48, the arcuate surface 132 of the annular ring 130 slides over the front surface 134 of the base 46. The annular ring 130 reduces the friction between the activation lever 48 and the base 46 because the surface 132 of the annular ring 130 is arcuate, and therefore, less surface area is in contact with the surface 134 of the base 46. This assists in more effective rotation for the activation lever 48 to activate the ratchet mechanism 24 to prevent protraction of the belt 19. In another embodiment of the invention, the annular ring 130 has been removed.

The upper end 129a of the center portion 76 comprises an angling surface 136 which angles inward from the upper end 129a while proceeding radially and longitudinally inward on the center portion 76. The cover 54 comprises an inner surface 140 and an annular ring 138 which projects from the inner surface 140. When the cover 54 covers the base 46, the post 56 fits into the annular ring 138 to align an upper end 139 of the post 56 and to maintain the post 56 substantially perpendicular to the base 46 which assists in effective rotation for the activation lever 48. The annular ring 138 comprises an inner surface 143 which slopes inward while proceeding toward the cover 54 to guide the post 56 while mounting the cover 54 on the base 46. The post 56 comprises a top surface 144 which may engage the inner surface 140 of the cover 54 to prevent deflecting of the cover 54, which deflecting may interfere with the components of the activation mechanism 38. The annular ring 138 may extend axially along the upper end 139 of the post 56. An annular groove 152 is formed between the angling surface 136 and an outer surface 153 of the post 56, and the annular ring 138 may extend into the annular groove 152. Manifestly, to provide effective rotation for the activation lever 48 about the post 56, it is important to maintain the post 56 substantially perpendicular to the base 46 and to maintain the activation lever 48 free from interference.

Returning to FIG. 3, the cover 54 attaches to the base 46 with the screws 42 which also attach the base 46 to the retractor 10. Alternatively, separate screws may be employed to attach the cover to the base.

Since the activation mechanism 38 of the present invention is a small modular unit with the capability of being used with a vast range of retractors, the base 46 should be as small as possible to effectively retain and locate the above mentioned necessary components, namely the activation lever 48, the post 56 and the solenoid 52 and not to require any, or only slight, additional space beyond that required for a typically retractor in the vehicle to which it will be installed. In the illustrated embodiment, the post 56 is located in the upper left-hand corner of the base 46 and extends integrally and normal from the surface 134 of the base 46. This location for the post 56 enables the plunger portion 74 of the activation lever 48 to attach to the plunger 68 and the engaging portion 110 of the pawl portion 78 of the activation lever 48 to extend out of the activation mechanism 38 and into the retractor 10 to effectively actuate the ratchet mechanism 24.

Returning now to FIG. 4, the base 46 comprises a solenoid recess 170 which extends lengthwise along the lower portion of the base 46. The solenoid recess 170 comprises a bottom surface 172, a pair of side surfaces 174a and 174b and a pair of end surfaces 174c and 174d (FIG. 3). The side surfaces are spaced apart a distance "W" which is slightly more than the width of the solenoid housing 72, and the end surfaces 174c and 174d are spaced apart a distance "L" (FIG. 3) which is slightly more than the length of the solenoid housing 72.

The solenoid housing 72 comprises a bottom surface 176, a pair of side surfaces 178a and 178b and a pair of end surfaces 178c and 178d (FIG. 3). The bottom surface 176 of the solenoid housing 72 engages the bottom surface 172 of the solenoid recess 170. To prevent transverse and longitudinal movement of the solenoid 52 with respect to the base 46, the side surfaces 174a and 174b of the solenoid recess 170 may engage the side surfaces 178a and 178b of the solenoid housing 72, and as illustrated in FIG. 3, the end surfaces 174c and 174d of the solenoid recess 170 may engage the side surfaces 178c and 178d of the solenoid housing 72.

The base 46 comprises a plurality of tabs 146, preferably four, to secure the solenoid 52 to the base 46. In another embodiment of the invention, three tabs, rather than four tabs, are employed. Each tab 146 comprises a first end 154 which extends integrally from the base 46 at a location adjacent the solenoid recess 170 and a second free end 156 which is opposite the first end 154. The free end 156 comprises an integrally formed hook 148, and the hook 148 comprises a surface 158 underneath the hook 148 to engage the solenoid housing 72. Each tab 146 comprises an inner surface 160, and this inner surface 160 and the surface 158 of the hook 148 are generally at an angle, in this instance approximately 75 degrees to 105 degrees, to one another to engage either of the edges 161a and 161b of the solenoid housing 72 which, in this instance, are right angles. The tabs 146 are preferably arranged in opposing pairs. For example, one is located to engage the edge 161a and the other to engage the edge 161b. Each tab 146 is located near a corner of the solenoid housing 72. In each pair, each tab 146 is resiliently biased inward toward the other to assist in firmly securing the solenoid 52 in the solenoid recess 170. Each of the hooks 148 of each tab 146 comprises an outer surface 159 which is rounded to enable the solenoid housing 72 to cam thereagainst and bias each of the tabs 146 outward as the solenoid 52 is installed on the base 46.

Manifestly, this arrangement for the post 56 and the solenoid 52 is exemplary and not limiting, and such components may be arranged accordingly to activate other retractors which require the activation mechanism to be mounted in a different manner or location upon the retractor.

The cover 54 covers and seals the activation mechanism 38 to keep out foreign objects, such as dust particles. To cover the components, the cover 54 comprises a similar perimeter shape as that for the base 46, as viewed in plan, and a height which exceeds the components and which enables the annular ring 138 to cooperate with the post 56 as described above. The screws 42 secure the cover 54 and the base 46 together along a parting line 150 to seal the activation mechanism 38.

In general operation, and as best illustrated in FIGS. 1, 3, and 6, the activation mechanism 38 is preferably activated by the sensing mechanism (not shown) which activates the anti-lock braking system 66. When activated, the anti-lock braking system 66 transmits a signal to the switch box 64 which then switches to close the circuit 60. Alternatively, the sensing mechanism may directly transmit a signal to the switch box 64, or manifestly, any device may transmit a signal to the switch box 64 or directly to the solenoid 52. With the circuit 60 closed, the power source 62 energizes the solenoid 52. Once energized, the coil (not shown) of the solenoid 52 attracts the shaft 88 to retract the plunger 68 inward which compresses the spring 50 and rotates the activation lever 48 counter-clockwise. More particularly, as the plunger 68 attracts and the activation lever 48 rotates, the inner surface 100 of the end stop 90 of the plunger 68 engages the front surface 97 of the slot portion 82 of the activation lever 48 to cause the activation lever 48 to rotate. The activation lever 48 rotates counter-clockwise from its neutral position to its activated position in which it pivots the pawl 26 of the ratchet mechanism 24 counter-clockwise into engagement with the teeth 22 of the ratchet wheels 20a and 20b. As a result, the ratchet mechanism 24 prohibits belt 19 protraction.

When the sensing mechanism (not shown) deactivates the anti-lock braking system 66, the anti-lock braking system 66 also discontinues transmitting a signal the switch box 64. Subsequently, the switch box 64 switches to open the circuit 60. With the circuit 60 open, the power source 62 does not energize the solenoid 52. Without power to the solenoid 52, the spring 50 drives the plunger 68 outward from the solenoid housing 72. More particularly, the intermediate stop 92 of the plunger 68 pushes into the recess 99 in the back surface 98 of the slot portion 82 of the activation lever 48 to rotate the activation lever 48 clockwise to its neutral position. As a result, the ratchet mechanism 24 is subject only to the inertial mechanism 36, and in some instances, the pawl 26 of the ratchet mechanism 24 is biased away from the ratchet wheels 20a and 20b by gravity.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompany drawings shall be interpreted as illustrative and not in a limiting sense.

What is claimed is:

1. An activation mechanism for a seat belt retractor used in a vehicle to prevent seat belt protraction, the seat belt retractor comprising a retractor frame, a reel having a reel shaft journaled for rotation in the retractor frame, a seat belt wound on the reel, a ratchet wheel being coupled to the reel for rotation therewith and having ratchet teeth disposed thereon, and a pawl being pivotally mounted on the retractor for rotation between an inoperative position in which the pawl is spaced from the ratchet teeth and an operative position in which the pawl is engaged with the ratchet teeth to lock the reel against rotation in a belt protraction direction, the activation mechanism comprising:

an activation lever having an arm for engagement with the pawl of the retractor and being pivotally mounted for movement between a neutral position in which the arm is spaced from the pawl of the retractor and an actuated position in which the arm urges the pawl into engagement with the ratchet teeth to lock the reel against rotation in the belt protraction direction;

actuating means for actuating the activation lever from its neutral position to its actuated position upon being energized and having a spring for moving the activation lever from its actuated position to its neutral position upon being de-energized;

an energizing means for energizing the actuating means; and a control means for controlling the energizing means being in response to a braking system used in a vehicle and enabling the energizing means to energize the actuating means when the braking system is activated and prohibiting the energizing means from energizing the actuating means when the braking system is deactivated.

2. An activation mechanism in accordance with claim 1 wherein the braking system comprises an anti-lock braking system.

3. An activation mechanism in accordance with claim 1 comprising a base for mounting the activation mechanism to the seat belt retractor and wherein the activation lever is pivotally mounted on the base and the actuating means is mounted on the base.

4. An activation mechanism in accordance with claim 3 being externally mounted to the seat belt retractor for actuating the seat belt retractor to prevent seat belt protraction and wherein the arm comprises a finger extending from the arm with a predetermined angle into the retractor for engaging underneath the pawl to urge the pawl into engagement with the ratchet wheel.

5. An activation mechanism in accordance with claim 1 wherein the actuating means comprises a solenoid having a plunger for moving the activation lever from its neutral position to its actuated position.

6. An activation mechanism in accordance with claim 5 wherein the activation lever comprises an arm extending to the solenoid for attaching to the plunger of the solenoid.

7. An activation mechanism in accordance with claim 6 wherein the arm for engagement with the pawl and the arm for attaching to the plunger are at a predetermined angle with respect to one another for being able to extend into the retractor and to attach to the plunger of the solenoid and the predetermined angle being dependant upon positioning of the activation lever and solenoid with respect to the retractor.

8. An activation mechanism for a seat belt retractor used in a vehicle to prevent seat belt protraction and which activates in response to an anti-lock braking system, the seat belt retractor comprising a retractor frame, a reel having a reel shaft journaled for rotation in the retractor frame, a seat belt wound on the reel, a ratchet wheel being coupled to the reel for rotation therewith and having ratchet teeth disposed thereon, and a pawl being pivotally mounted on the retractor for rotation between an inoperative position in which the pawl is spaced from the ratchet teeth and an operative position in which the pawl is engaged with the ratchet teeth to lock the reel against rotation in a belt protraction direction, the activation mechanism comprising:

a base for mounting the activation mechanism to the retractor;

an activation lever having an arm for engagement with the pawl of the retractor and being mounted on the base for movement between a neutral position in which the arm is spaced from the pawl of the retractor and an actuated position in which the arm urges the pawl into engagement with the ratchet teeth to lock the reel against rotation in the belt protraction direction;

a solenoid having a plunger for moving the activation lever from its neutral position to its actuated position upon being energized and having a spring for moving the activation lever from its actuated to its neutral position upon the solenoid being de-energized;

a means for energizing the solenoid in response to the anti-lock braking system; and a means for communicating with the anti-lock braking system and with the energizing means and being connected to the solenoid.

9. An activation mechanism in accordance with claim 8 wherein the activation lever is pivotally mounted to the base and is rotated by the solenoid and the spring between its neutral position and its actuated position.

10. An activation mechanism in accordance with claim 9 wherein the activation lever comprises an arm for attaching to the plunger of the solenoid.

11. An activation mechanism in accordance with claim 10 wherein the arm for engagement with the pawl and the arm for attaching to the plunger are at a predetermined angle with respect to one another for being able to extend into the retractor and to attach to the plunger of the solenoid and the predetermined angle being dependant upon the position of the activation lever and solenoid with respect to the base and the position of the activation mechanism with respect to the retractor.

12. An activation mechanism in accordance with claim 8 being externally mounted to the seat belt retractor for actuating the seat belt retractor to prevent seat belt protraction and wherein the arm for engagement with the pawl comprises a finger extending from the arm with a predetermined angle into the retractor for engaging underneath the pawl to urge the pawl into engagement with the ratchet wheel.

13. An activation mechanism in accordance with claim 8 wherein the energizing means comprises a power source for powering the solenoid and a switch means for responding to the anti-lock braking system and the communicating means connects the power source and the switch means to the solenoid in responding to the anti-lock breaking system.

14. An activation mechanism in accordance with claim 8 comprising a cover to cover the activation lever and the solenoid for preventing damage.

15. An activation mechanism in accordance with claim 8 wherein the seat belt retractor comprises an inertial means for pivoting the pawl to its operative position in response to accelerations and decelerations of the vehicle greater than a predetermined value.

16. An activation mechanism being externally mounted to a seat belt retractor and being actuated in response to an anti-lock braking system to actuate the seat belt retractor to prevent seat belt protraction, the seat belt retractor comprising a frame, a spool for winding a length of seat belt thereon, an axle for supporting the spool on the frame, at least one ratchet wheel attached to the spool having ratchet teeth, a pawl pivotally supported from the frame and pivotable between a first position in which the pawl is spaced from the ratchet wheel and a second position in which the pawl is engaged with the ratchet wheel to prevent the seat belt from being protracted from the retractor, and an inertial means for pivoting the pawl to the second position in response to a change in acceleration of the vehicle, the activation mechanism comprising:

a base being externally mounted to the frame of the retractor;

an activation lever being pivotally mounted on the base and being pivotable between a neutral position in which the activation lever is spaced from the pawl of the retractor and an actuated position in which the activation lever is engaged with the pawl to urge to pawl into engagement with the ratchet wheel;

a biasing means for biasing the activation lever to its neutral position;

a solenoid being mounted on the base and having a plunger and the plunger being attached to the activation lever and moving linearly in response to the anti-lock braking system to pivot the activation lever from its neutral position to its actuated position;

a power means for powering the solenoid;

a switch means being responsive to the anti-lock braking system and having a response sending means for enabling the power means to power the solenoid in response to the anti-lock breaking system; and the solenoid having a means for communicating with the power means in response to the switch means.

* * * * *

UNITED STATES PATENT AND TRADEMARK OFFICE
CERTIFICATE OF CORRECTION

PATENT NO. : 5,441,304
DATED : August 15, 1995
INVENTOR(S) : Zygutis, et al.

It is certified that error appears in the above-indentified patent and that said Letters Patent is hereby corrected as shown below:

Column 14, line 65, change "breaking" to --braking--.

Column 16, line 6, change "to" (second occurrence) to --the--.

Column 16, line 20, change "breaking" to --braking--.

Signed and Sealed this

Twenty-eighth Day of November 1995

Attest:

BRUCE LEHMAN

*Attesting Officer*  *Commissioner of Patents and Trademarks*